US010533105B2

(12) United States Patent
Shimamura

(10) Patent No.: US 10,533,105 B2
(45) Date of Patent: Jan. 14, 2020

(54) AQUEOUS PIGMENT DISPERSION, INK-JET RECORDING INK, AND PRINTED ARTICLE

(71) Applicant: DIC CORPORATION, Tokyo (JP)

(72) Inventor: Yoshinosuke Shimamura, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 16/415,795

(22) Filed: May 17, 2019

(65) Prior Publication Data

US 2019/0270902 A1    Sep. 5, 2019

Related U.S. Application Data

(63) Continuation of application No. 15/507,846, filed as application No. PCT/JP2015/074836 on Sep. 1, 2015, now abandoned.

(30) Foreign Application Priority Data

Sep. 2, 2014    (JP) ................................ 2014-178046

(51) Int. Cl.
| | |
|---|---|
| *C08L 23/06* | (2006.01) |
| *C09D 11/38* | (2014.01) |
| *C09D 17/00* | (2006.01) |
| *C09D 11/326* | (2014.01) |
| *C09D 11/322* | (2014.01) |
| *C09D 11/328* | (2014.01) |

(52) U.S. Cl.
CPC ............ *C09D 11/38* (2013.01); *C09D 11/322* (2013.01); *C09D 11/326* (2013.01); *C09D 11/328* (2013.01); *C09D 17/00* (2013.01); *C09D 17/001* (2013.01); *C09D 17/002* (2013.01); *C09D 17/003* (2013.01); *C09D 17/005* (2013.01)

(58) Field of Classification Search
CPC ...... C09D 11/107; C09D 11/38; C09D 11/326
See application file for complete search history.

(56) References Cited

U.S. PATENT DOCUMENTS

| 5,116,712 A * | 5/1992 | Nakamura | ............... G03G 9/09 |
| | | | 106/413 |
| 2002/0143101 A1 | 10/2002 | Probst et al. | |
| 2003/0041777 A1* | 3/2003 | Karl | ..................... C09D 11/322 |
| | | | 106/31.65 |
| 2015/0044433 A1* | 2/2015 | Mao | ..................... C09D 127/18 |
| | | | 428/204 |

FOREIGN PATENT DOCUMENTS

| JP | 9-94916 A | 4/1997 |
| JP | 10-298474 A | 11/1998 |
| JP | 11-80628 A | 3/1999 |
| JP | 2001-80204 A | 3/2001 |
| JP | 2005-048012 * | 2/2005 |
| JP | 2005-048012 A | 2/2005 |
| JP | 2008-266564 A | 11/2008 |
| JP | 2009-144060 A | 7/2009 |
| JP | 2013-23683 A | 2/2013 |
| JP | 2013-87192 A | 5/2013 |
| JP | 2013-517962 A | 5/2013 |
| JP | 2013-227583 A | 11/2013 |
| JP | 2014-73675 A | 4/2014 |
| JP | 5577475 B1 | 8/2014 |
| JP | 2015-193718 A | 11/2015 |
| WO | 2013/036283 A1 | 3/2013 |

OTHER PUBLICATIONS

Translation of JP 2005-048012 (2005) (Year: 2005).*
International Search Report dated Nov. 24, 2015, issued in counterpart International Application No. PCT/JP2015/074836.
Non-Final Office Action dated Mar. 7, 2018, issued in U.S. Appl. No. 15/507,846.
Final Office Action dated Jul. 18, 2018, issued in U.S. Appl. No. 15/507,846.
Non-Final Office Action dated Feb. 26, 2019, issued in U.S. Appl. No. 15/507,846.

* cited by examiner

*Primary Examiner* — Robert C Boyle
(74) *Attorney, Agent, or Firm* — Westerman, Hattori, Daniels & Adrian, LLP

(57) ABSTRACT

The method prepares an aqueous pigment dispersion. The method includes the following steps: providing a silica liquid including a hydrophilic fumed silica, potassium hydroxide and ion exchanged water; providing a styrene-acrylic acid copolymer obtained by copolymerizing monomers including a styrene monomer at an amount of 50 to 90 mass %; providing an aqueous medium; mixing a pigment with the styrene-acrylic acid copolymer and the aqueous medium to prepare a first mixture; and subsequently mixing the first mixture with the silica liquid to prepare the aqueous pigment dispersion.

9 Claims, No Drawings

AQUEOUS PIGMENT DISPERSION, INK-JET RECORDING INK, AND PRINTED ARTICLE

CROSS-REFERENCE TO RELATED APPLICATIONS

This application is a continuation of U.S. application Ser. No. 15/507,846, filed on Mar. 1, 2017, which is a 371 of International Application No. PCT/JP2015/074836, filed on Sep. 1, 2015, which is based upon and claims the benefit of priority from the prior Japanese Patent Application No. 2014-178046, filed on Sep. 2, 2014.

TECHNICAL FIELD

The present invention relates to an aqueous pigment dispersion and an ink jet recording ink and printed article in which the aqueous pigment dispersion is used.

BACKGROUND ART

Paints and inks using water as a medium are used in a wide range of fields because they are safe and have a small impact on environment. Aqueous inks that can be applied to ink jet recording are, for example, usable in a closed space and therefore expected to replace electrophotographic products for household, office, and industrial uses.

Aqueous inks are, however, used in printing in a liquid state of which the pigment concentration is much lower than that of toner, and a printed matter therefore has a small optical density (also referred to as OD value, image density, or coloring density); in particular, in the case where a recording medium is plain paper, the ink easily soaks into the paper, which results in the problem that high optical density is less likely to be produced.

Optical density itself is a property inherent in aqueous inks. In general, aqueous inks are prepared by diluting an aqueous pigment dispersion or an aqueous pigment composition having a high pigment concentration, which is called a pigment paste, with water or an aqueous medium; hence, the optical density is considered not only in an ink having a low pigment concentration but also in a pigment dispersion itself having a high pigment concentration.

Patent Literature 1, for instance, discloses a black pigment dispersion that is used in an aqueous ink jet recording pigment ink to produce high coloring density (OD value) in printing on plain paper; in particular, such a black pigment dispersion is an aqueous black pigment dispersion that contains carbon black having a predetermined primary particle size, a specific surface area, and DBP oil absorption and a resin having a specific composition and acid value.

In this disclosure, however, the type and properties of the pigment are not specified, and a method for producing high coloring density also in use of general aqueous pigment dispersions is not explained.

One of known additives of inorganic particles is fumed silica (fumed silica particles). Fumed silica is generally used as a thickener in a UV ink for flexography with a printing plate (for example, see Patent Literature 2) or as a pigment for the receiving layer of an ink jet recording medium (for instance, see Patent Literature 3).

In a known example of using fumed silica in an ink jet recording ink, hydrophobic fumed silica that is an example of hydrophobic silica fine particles is used to address bronzing of an ink containing a pigment of a chromatic color (for instance, see Examples 1 and 2 in Patent Literature 4).

Use of hydrophilic fumed silica in an aqueous pigment dispersion for producing high optical density, however, has not been known.

CITATION LIST

Patent Literature

PTL 1: Japanese Unexamined Patent Application Publication No. 2009-144060
PTL 2: Japanese Unexamined Patent Application Publication (Translation of PCT Application) No. 2013-517962
PTL 3: Japanese Unexamined Patent Application Publication No. 2001-80204
PTL 4: Japanese Unexamined Patent Application Publication No. 2008-266564

SUMMARY OF INVENTION

Technical Problem

It is an object of the present invention to provide an aqueous pigment dispersion that has a dispersion stability kept at a high level and that serves to produce high optical density and to provide an ink jet recording ink containing such an aqueous pigment dispersion.

Solution to Problem

The inventors have found that an aqueous pigment dispersion containing a pigment, hydrophilic fumed silica, and an aqueous medium serves to produce high optical density.

Patent Literature 4 discloses an example of using hydrophobic fumed silica in an ink jet recording ink for addressing bronzing of an ink containing a pigment of a chromatic color as described above. Hydrophobic silica including fumed silica, however, cannot be finely dispersed in an aqueous medium in a composition and therefore does not have an effect on optical density; on the contrary, it has an adverse effect on optical density (this is apparent from evaluation of color development on plain paper in Table 1 in Patent Literature 4).

It has been found in the present invention that using a proper amount of hydrophilic fumed silica, which can be finely dispersed in an aqueous medium, is effective in production of high optical density that has been considered.

In particular, the present invention provides an aqueous pigment dispersion containing a pigment, hydrophilic fumed silica, and an aqueous medium.

The present invention also provides an ink jet recording ink containing such an aqueous pigment dispersion.

The present invention also provides a printed article in which the aqueous pigment dispersion is used.

Advantageous Effects of Invention

The present invention enables production of an aqueous pigment dispersion that gives high optical density and that has a high storage stability.

DESCRIPTION OF EMBODIMENTS (Pigment)
A pigment used in the present invention is at least one pigment selected from commonly known organic pigments or inorganic pigments. Furthermore, not only an untreated pigment but also a treated pigment such as a so-called self-dispersible pigment can be used in the present invention. In the case of printing in which plain paper is used as a recording medium, a yellow ink, a cyan ink, a magenta ink, a black ink, and an ink of another color are used. Pigments used therein are not particularly limited, and pigments generally used in aqueous inks can be employed. In particular, known inorganic or organic pigments that can be dispersed in water and a water-soluble organic solvent can be used. Examples of the inorganic pigments include iron oxide and carbon blacks produced by known methods such as a contact method, a furnace method, and a thermal method. Examples of the organic pigments include azo pigments (including azolake, insoluble azo pigments, condensed azo pigments, and chelate azo pigments), polycyclic pigments (e.g., phthalocyanine pigments, perylene pigments, perinone pigments, anthraquinone pigments, quinacridone pigments, dioxazine pigments, thioindigo pigments, isoindolinone pigments, and quinophthalone pigments), dye chelates (e.g., basic dye chelates and acid dye chelates), nitro pigments, nitroso pigments, and aniline black.

Examples of pigments used in black inks include #2600 series, #2300 series, #1000 series, #900 series, and MA series manufactured by Mitsubishi Chemical Corporation; COLOR-BLACK series, SPESIAL-BLACK series, PRINTEX series, HIBLACK series, NEROX series, and NIPex series manufactured by Orion Engineered Carbons S.A.; SUNBLACK series, #70 series, and #80 series manufactured by Asahi Carbon Co., Ltd.; and TOKABLACK #7000 series and TOKABLACK #8000 series manufactured by TOKAI CARBON CO., LTD.

In particular, acid carbon blacks are preferred because they enable a high OD value and can be easily dispersed; for example, carbons with PH of not more than 4.5 are preferred, such as MA series, #900 series, and #2300 series manufactured by Mitsubishi Chemical Corporation, NEROX 600 and NIPex 160IQ manufactured by Orion Engineered Carbons S.A., and SUNBLACK-X series manufactured by Asahi Carbon Co., Ltd. The acid carbon blacks are well hydrophilic and reduce use of a dispersant that generally decreases the surface tension of an ink and thus causes soaking of the ink, which enables a high OD value to be produced.

Specific examples of pigments used in yellow inks include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Specific examples of pigments used in magenta inks include C.I. Pigment Red 5, 7, 12, 48(Ca), 48(Mn), 57(Ca), 57:1, 112, 122, 123, 146, 168, 176, 184, 185, 202, 209, and 254.

Specific examples of pigments used in cyan inks include C.I. Pigment Blue 1, 2, 3, 15, 15:3, 15:4, 16, 22, 60, 63, and 66.

In the case where the pigment is used in an aqueous ink particularly for ink jet recording, the amount of the pigment (on a mass basis) is preferably in the range of 0.5 to 30 mass %, and more preferably 1.0 to 12 mass % relative to the amount of the whole aqueous ink. In order to produce sufficient optical density in recording on plain paper, the amount of the pigment is most preferably in the range of 3 mass % to 12 mass %. At an amount of less than 3 mass %, print density may be insufficient in recording on plain paper; at an amount of greater than 12 mass %, the ejection stability of an aqueous ink to be ejected from an ink jet head may be reduced as a result of, for instance, an increase in the viscosity of the ink.

The particle size of the pigment is preferably 1 µm or less, more preferably from 10 nm to 150 nm, and further preferably from 50 nm to 120 nm.

(Hydrophilic Fumed Silica)

Any of known hydrophilic fumed silica can be used in the present invention. Fumed silica can be produced by high-temperature hydrolysis of highly purified silicon tetrachloride in oxyhydrogen flame, and the produced fumed silica can be hydrophilic or hydrophobic depending on surface treatment. In the present invention, hydrophilic fumed silica is used.

Examples of such hydrophilic silica include Aerosil W7520, 130, 200, 300, and R816 (trade names, manufactured by NIPPON AEROSIL CO., LTD. and Degussa AG); Cabosil MS-5 and MS-7 (trade names, manufactured by Cabot Corporation); Rheorosil QS-102 and 103 (trade names, manufactured by Tokuyama Corporation); and Nipsil LP (trade name, manufactured by Nippon Silica Industries).

Fumed silica needs to be finely dispersed in a composition; in the case where it is not finely dispersed, light is scattered under visible light, which may cause an adverse effect on optical density. In this regard, the fumed silica used in the aqueous pigment dispersion of the present invention needs to be hydrophilic fumed silica. Hydrophobic fumed silica cannot be finely dispersed in an aqueous medium and therefore has an adverse effect on optical density.

In general, it is desirable that fumed silica be finely dispersed so as to have a particle size that is less than or equal to approximately a quarter of light wavelength. Hence, the average primary particle size of the fumed silica is preferably not more than 50 nm, and more preferably not more than 30 nm. Furthermore, the average primary particle size is preferably not less than 5 nm, and more preferably not less than 7 nm. At an average primary particle size of less than 5 nm, silica particles have an unnecessarily strong cohesive force in response to an increase in the surface area thereof and therefore become hard to be finely dispersed in some cases. The specific surface area of fumed silica, which is measured by a BET method, is preferably in the range of 50 to 500 $m^2/g$. The specific surface area is desirably not less than 100 $m^2/g$, and more desirably not less than 300 $m^2/g$.

The excessively small average particle size of dispersed fumed silica tends to reduce the effect of enhancing optical density. The excessively large average particle size thereof leads to a reduction in the smoothness of a print surface; in particular, use of fumed silica having such a particle size in an ink jet recording ink may impair ejection of the ink from a nozzle. Accordingly, the average particle size of the dispersed particles is preferably not more than 250 nm, also preferably from 50 to 250 nm, more preferably from 100 to 200 nm corresponding to approximately a quarter of light wavelength, and most preferably from 150 to 180 nm.

Fumed silica has a broad particle size distribution but has a large effect of enhancing optical density.

Unnecessarily broad particle size distribution causes some particles having a large particle size to have an adverse effect on ejection properties; hence, standard deviation (SD) of the distribution is preferably in the range of 50 to 100 nm, and more preferably 70 to 85 nm.

Although the amount of the fumed silica is not particularly limited, an excessively small amount does not bring a sufficient effect of an enhancement in an OD value. An unnecessarily large amount causes impairment of other properties (an increase in viscosity and reductions in the scratch resistance of a print surface and in ejection properties) and a decrease in the degree of an enhancement in an OD value relative to the amount of the fumed silica. Accordingly, particularly in order to enhance an OD value, the amount of the fumed silica is preferably not less than 20 mass % relative to the pigment content. In particular, the amount is preferably in the range of 20 to 300 mass %; however, since an excess in the amount causes impairment of ejection properties, the amount is preferably in the range of 20 to 200 mass %, and most preferably 20 to 100 mass %.

The mechanism of the enhancement in optical density that is brought about by addition of the fumed silica has been still studied but is presumed to be as follows. In other words, the aqueous pigment dispersion of the present invention on the surface of a printed article is speculated to be as follows.

(i) The degree of an enhancement in the viscosity of the aqueous pigment dispersion under drying increases, and the pigment in the dispersion is therefore less likely to soak into a printed article. As a result, the pigment is likely to remain on the surface of the printed article, which leads to an enhancement in the optical density of the printed article.

(ii) The presence of the silica causes gaps to be readily formed between the pigments in a dried coating film, which gives a three-dimensional structure. The apparent surface area of the pigment therefore increases, and thus the frequency of light reflection increases, which leads to an enhancement in optical density.

(iii) Since the fumed silica is characterized in being amorphous, the interaction between the pigment and the silica is likely to occur in the middle of drying. The "increase in the viscosity of the dispersion" and the "formation of gaps between the pigments in a dried coating film" are likely to occur, which leads to an enhancement in optical density.

Such physical phenomena are less likely to occur in colloidal silica that has a substantially spherical shape and a narrow particle size distribution and are likely to occur in fumed silica that has a small sphericity and a relatively broad particle size distribution. These are presumed to be the mechanism that the fumed silica serves to enhance the optical density (OD) of a printed article.

(Aqueous Medium)

An aqueous solvent used in the present invention is, for example, a water-soluble solvent and/or water. Water may be used alone, or a mixed solvent of water and a water-soluble solvent may be used. Examples of the water-soluble solvent include ketones such as acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1,4-dioxane, and 1,2-dimethoxyethane; and amides such as dimethyl formamide and N-methyl pyrrolidone. In particular, compounds selected from the group consisting of ketones having 3 to 6 carbon atoms and alcohols having 1 to 5 carbon atoms are preferably used.

In addition, water-soluble organic solvents that can be dissolved in an aqueous material can be used. Examples thereof include a variety of other solvents known as water-soluble organic solvents: glycols such as ethylene glycol, diethylene glycol, triethylene glycol, tetraethylene glycol, propylene glycol, polyethylene glycol, and polypropylene glycol; diols such as butane diol, pentane diol, hexane diol, and homologous diols thereto; glycol esters such as propylene glycol laurate; glycol ethers such as ethers of diethylene glycol monoethyl, diethylene glycol monobutyl, and diethylene glycol monohexyl and cellosolve including a propylene glycol ether, a dipropylene glycol ether, and a triethylene glycol ether; alcohols such as methanol, ethanol, isopropyl alcohol, 1-propanol, 2-propanol, 1-butanol, 2-butanol, butyl alcohol, pentyl alcohol, and homologous alcohols thereto; sulfolanes; lactones such as γ-butyrolactone; lactams such as N-(2-hydroxyethyl)pyrrolidone; glycerin and derivatives thereof; and polyoxyethylenebenzyl alcohol ether. These water-soluble organic solvents may be used alone or in combination.

Among such solvents, polyhydric alcohols having a high boiling point, low volatility, and a high surface tension, such as glycols and diols, are preferred; in particular, glycols such as diethylene glycol and triethylene glycol are preferred.

(Process for Producing Aqueous Pigment Dispersion)

The aqueous pigment dispersion of the present invention can be produced by any of known techniques. The aqueous pigment dispersion can be produced by, for example, any of the following processes. (1) The pigment, the aqueous medium, and optionally a pigment dispersant or another additive are used and subjected to medium-less dispersion; and then the hydrophilic fumed silica is added thereto. (2) An aqueous dispersion liquid having a high pigment concentration (pigment paste) is prepared in advance, and the aqueous dispersion liquid is diluted with an aqueous medium with the hydrophilic fumed silica and optionally another additive being added thereto.

(Pigment Dispersant)

A pigment dispersant is preferably optionally used in the present invention. Any of known pigment dispersants may be used and dispersed in water, or a surfactant may be used.

The pigment dispersant may be an aqueous resin.

Preferred examples thereof include acrylic resins such as polyvinyl alcohols, polyvinylpyrrolidones, and acrylic acid-acrylate copolymers; acrylic copolymers having an anionic group, such as styrene-acrylic acid copolymers, styrene-methacrylic acid copolymers, styrene-methacrylic acid-acrylate copolymers, styrene-α-methyl styrene-acrylic acid copolymers, and styrene-α-methyl styrene-acrylic acid-acrylate copolymers; styrene-maleic acid copolymers; styrene-maleic anhydride copolymers; vinylnaphthalene-acrylic acid copolymers; and salts of these aqueous resins.

Among these, acrylic copolymers having an anionic group are preferred.

(Acrylic Copolymer Having Anionic Group)

Examples of the acrylic copolymers having an anionic group in the present invention include acrylic copolymers having an anionic group and containing a carboxylic group, a sulfonate group, or a phosphate group. Specific examples thereof include copolymers of a monomer having an anionic group, such as (meth)acrylic acid, and another unsaturated ethylene monomer that is copolymerizable therewith. The term "(meth)acrylic acid" herein comprehensively refers to an acrylic acid and a methacrylic acid. The same holds true for a variety of esters of a (meth)acrylic acid.

In terms of enhancements in the hydrophobicity of the copolymer and in adsorption of the copolymer to the surface of the pigment on the basis of the same acid value, preferred examples of such another copolymerizable unsaturated ethylene monomer include styrene; alkylstyrene such as α-methylstyrene, β-methylstyrene, 2,4-dimethylstyrene, α-ethylstyrene, α-butylstyrene, and α-hexylstyrene; halogenated styrene such as 4-chlorostyrene, 3-chlorostyrene, and 3-bromostyrene; other styrene monomers such as 3-nitrostyrene, 4-methoxystyrene, and vinyltoluene; and (meth)acrylate monomers having a benzene ring, such as benzyl (meth)acrylate, phenyl (meth)acrylate, phenylethyl (meth)acrylate, phenylpropyl (meth)acrylate, and phenoxyethyl (meth)acrylate. In particular, among these, styrene monomers such as styrene, α-methylstyrene, and tert-butylstyrene are especially preferred.

The copolymer used in the present invention may be any of copolymers containing the polymerization unit of (meth) acrylic acid and the polymerization unit of another copolymerizable unsaturated ethylene monomer as essential polymerization units and may be a binary copolymer thereof or a ter- or higher multi-component copolymer with another copolymerizable unsaturated ethylene monomer.

Examples of such a copolymerizable unsaturated ethylene monomer include acrylates and methacrylates, such as methyl acrylate, methyl methacrylate, n-propyl acrylate, isopropyl acrylate, n-butyl acrylate, sec-butyl acrylate, tert-butyl acrylate, 2-ethylbutyl acrylate, 1,3-dimethylbutyl acrylate, hexyl acrylate, 2-ethylhexyl acrylate, octyl acrylate, ethyl methacrylate, n-butyl methacrylate, 2-methylbutyl methacrylate, pentyl methacrylate, heptyl methacrylate, and nonyl methacrylate; acrylate derivatives and methacrylate derivatives, such as 3-ethoxypropyl acrylate, 3-ethoxybutyl acrylate, dimethylaminoethyl acrylate, 2-hydroxyethyl acrylate, 2-hydroxybutyl acrylate, ethyl-α-(hydroxymethyl) acrylate, dimethylaminoethyl methacrylate, hydroxyethyl methacrylate, and hydroxypropyl methacrylate; aryl acrylates and aralkyl acrylates, such as phenyl acrylate, benzyl acrylate, phenylethyl acrylate, and phenylethyl methacrylate; monoacrylates and monomethacrylates of polyhydric alcohols, such as diethylene glycol, triethylene glycol, polyethylene glycol, glycerin, and bisphenol A; dialkyl maleates, such as dimethyl maleate and diethyl maleate; and vinyl acetate. At least one of these monomers may be added as a monomer component.

The copolymer used in the present invention may be a linear copolymer containing only the polymerization units of unsaturated monoethylene monomers or a copolymer having a cross-linked part attributed to copolymerization with a slight amount of any of various cross-linking unsaturated ethylene monomers.

Examples of the cross-linking unsaturated ethylene monomers include glycidyl (meth)acrylate, divinylbenzene, ethylene glycol di(meth)acrylate, propylene glycol di(meth) acrylate, polyethylene glycol di(meth)acrylate, poly(oxyethylene-oxypropylene) glycol di(meth)acrylate, and poly (meth)acrylates of polyhydric alcohols, such as tri(meth) acrylates of alkylene oxide adducts of glycerin.

In the present invention, on the assumption that the reaction rates of the monomers to be used are substantially the same as each other, the proportion of the amounts of the monomers is considered to be the proportion of the amounts of polymerization units of the monomers on a mass basis. The copolymer used in the present invention can be synthesized by a variety of known reaction processes such as bulk polymerization, solution polymerization, suspension polymerization, and emulsion polymerization. In such synthesis, commonly known polymerization initiators, chain transfer agents (polymerization modifiers), surfactants, and antifoaming agents may be used in combination.

Among the above-mentioned copolymers, especially preferred examples of the acrylic copolymer having an anionic group for use in the present invention include styrene-acrylic acid copolymers containing a styrene monomer and (meth) acrylic acid as raw material monomers, such as a styrene-(meth)acrylic acid copolymer, a styrene-(meth)acrylate-(meth)acrylic acid copolymer, and a (meth)acrylate-(meth) acrylic acid copolymer (the term "styrene-acrylic acid copolymer" herein refers to "copolymer containing a styrene monomer and (meth)acrylic acid as raw material monomers" as described above; thus, general-purpose monomers other than the styrene monomer and (meth)acrylic acid may be copolymerized as well).

The amount of the styrene monomer used as a raw material of such a styrene-acrylic acid copolymer is preferably in the range of 50 to 90 mass %, and especially preferably 70 to 90 mass %. In the case where the amount of the styrene monomer is 50 mass % or more, the styrene-acrylic acid copolymer has a good affinity for the pigment, and the aqueous pigment dispersion therefore tends to have an improved dispersion stability. Furthermore, an aqueous ink jet recording ink produced by using such an aqueous pigment dispersion tends to have enhanced recording properties in recording on plain paper, high image density, and high water resistance. In the case where the amount of the styrene monomer is 90 mass % or less within the above-mentioned range, the pigment coated with the styrene-acrylic acid copolymer can retain good dispersibility in an aqueous medium, so that the dispersibility and dispersion stability of the pigment in the aqueous pigment dispersion can be improved. Moreover, an ink jet recording ink composition containing such an aqueous pigment dispersion has a good print stability.

The styrene-acrylic acid copolymer is produced by copolymerization of a styrene monomer with at least one of acrylic acid monomers and methacrylic acid monomers. An acrylic acid and a methacrylic acid are preferably used in combination. This is because such combined use tends to enable good storage stability and production of a pigment dispersion liquid containing finer particles as a result of an enhancement in copolymerizability in resin synthesis and a consequent improvement in the homogeneity of the resin.

In the styrene-acrylic acid copolymer, the total amount of the styrene monomer, the acrylic acid monomer, and the methacrylic acid monomer in copolymerization is preferably 95 mass % or more relative to the whole monomer content.

The styrene-acrylic acid copolymer can be produced by an ordinary polymerization method; and examples thereof include solution polymerization, suspension polymerization, bulk polymerization, and another method in which polymerization is performed in the presence of a polymerization catalyst. Examples of the polymerization catalyst include 2,2'-azobis(2,4-dimethylvaleronitrile), 2,2'-azobisisobutyronitrile, 1,1'-azobis(cyclohexane-1-carbonitrile), benzoyl peroxide, dibutyl peroxide, and butyl peroxybenzoate. The amount of a polymerization catalyst to be used is preferably in the range of 0.1 to 10.0 mass % relative to the vinyl monomer component content.

The styrene-acrylic acid copolymer may be a random copolymer or a graft copolymer. An example of the graft copolymer is a graft copolymer including polystyrene or a copolymer of styrene and a nonionic monomer copolymerizable with styrene as a main chain or side chain and a copolymer of acrylic acid, methacrylic acid, and another monomer including styrene as a side chain or main chain. The styrene-acrylic acid copolymer may be a mixture of such a graft copolymer and a random copolymer.

The weight average molecular weight of the acrylic copolymer having an anionic group in the present invention is preferably in the range of 5000 to 20000. In the case where the styrene-acrylic acid copolymer is used, for instance, the weight average molecular weight thereof is preferably in the range of 5000 to 20000, more preferably 5000 to 18000, and especially preferably 5500 to 15000. The weight average molecular weight is measured by GPC (gel permeation chromatography) and based on the molecular weight of polystyrene used as a standard substance.

The styrene-acrylic acid copolymer used in the present invention has a carboxyl group derived from an acrylic acid monomer and a methacrylic acid monomer. The acid value of the styrene-acrylic acid copolymer is preferably in the range of 50 to 220 (mgKOH/g), and more preferably 60 to 200 (mgKOH/g). At an acid value of not more than 220 (mgKOH/g), the pigment tends to agglomerate.

The acid value is herein measured according to Japanese Industrial Standards "K 0070:1992. Test methods for acid value, saponification value, ester value, iodine value, hydroxyl value and unsaponifiable matter of chemical products" and corresponds to the amount of potassium hydroxide (mg) that is required to completely neutralize 1 g of resin.

An excessively low acid value results in low pigment dispersibility and storage stability and causes an aqueous ink jet recording ink described below to have a bad print stability, which is unfavorable. An excessively high acid value causes recorded color images to have a low water resistance, which is also unfavorable. In order to control the acid value of the copolymer to be within the above-mentioned range, (meth)acrylic acid is used in copolymerization so as to provide the intended range of acid value.

The weight ratio of the styrene-acrylic acid copolymer to the pigment (Resin/Pigment) is preferably in the range of 0.05 to 0.50, and more preferably 0.10 to 0.40. An unnecessarily small ratio is likely to result in reductions in the dispersibility and storage stability of the pigment, and an excessively large ratio is likely to result in impairment of the ejection stability of an ink jet ink.

(Basic Compound)

A basic compound is used in the present invention to neutralize the anionic group of the acrylic copolymer having an anionic group. The basic compound can be any of known ones. Examples of the basic compound include inorganic basic compounds including hydroxides of alkali metals such as potassium and sodium, carbonates of alkali metals such as potassium and sodium, carbonates of alkali earth metals such as calcium and barium, and ammonium hydroxide and organic basic compounds including amino-alcohols such as triethanolamine, N,N-dimethanolamine, N-aminoethylethanolamine, dimethylethanolamine, and N—N-butyldiethanolamine, morpholines such as morpholine, N-methylmorpholine, and N-ethylmorpholine, and piperazines such as N-(2-hydroxyethyl)piperazine and piperazine hexahydrate. In particular, alkali metal hydroxides such as potassium hydroxide, sodium hydroxide, and lithium hydroxide are preferred in terms of the ejection stability of an ink jet recording ink because they contribute to a reduction in the viscosity of an aqueous black pigment dispersion, and potassium hydroxide is especially preferred.

The rate of the neutralization of the anionic group with such basic compounds is not particularly limited; in general, it is in the range of 80 to 120 mass % in many cases. The rate of neutralization herein refers to the mass percentage of the amount of the basic compound to the amount that is necessary to neutralize all of the carboxyl groups of the organic high-molecular compound having an anionic group and is determined from the following equation.

Rate of neutralization (%)=[{Mass of basic compound (g)×56.11×1000}/{acid value of resin (mgKOH/g)×equivalent of basic compound× amount of resin (g)}]×100     [Math. 1]

In the case where an acid pigment is used as the pigment, an aqueous pigment dispersion to be produced has a low pH, and the acrylic copolymer having an anionic group has a low solubility in water; as a result, defective dispersion and a reduction in storage stability may occur.

In such a case, the acrylic copolymer having an anionic group may be added to the dispersion at a rate of neutralization that exceeds the range of 80 to 120 mass %.

In the case where the viscosity is greater than the above-mentioned range and inconvenient to be handled in the above-mentioned processes while the pigment content is in the above-mentioned range, the aqueous pigment dispersion may be properly diluted with an aqueous medium to have a predetermined range of viscosity.

(Dispersion Process)

The following processes that have been described above will now be described: (1) the pigment, the aqueous medium, and optionally a pigment dispersant or another additive are used and subjected to medium-less dispersion; and then the hydrophilic fumed silica is added thereto and (2) an aqueous dispersion liquid having a high pigment concentration (pigment paste) is prepared in advance, and the aqueous dispersion liquid is diluted with an aqueous medium with the hydrophilic fumed silica and optionally another additive being added thereto.

(1) Medium-less Dispersion of Aqueous Pigment Dispersion

The (1) medium-less dispersion in the present invention may be specifically ultrasonic dispersion or another dispersion process involving use of a high-speed disk impeller, a colloid mill, a roll mill, a high-pressure homogenizer, a nanomizer, or an ultimazer; in particular, ultrasonic dispersion is preferred in view of productivity and contamination brought about by abrasion of media (presence of foreign substances and pollution). An example involving use of ultrasonic dispersion in the present invention will now be described in detail.

It is preferred that the pigment and the aqueous medium be mixed with each other and stirred in advance of performing ultrasonic dispersion to enhance fluidity or to prevent precipitation of the pigment; however, such mixing and stirring are dispensable, and any type of mixer and stirrer can be used.

In this process, the viscosity is preferably in the range of 0.1 to 100 mPa·s, more preferably 0.5 to 50 mPa·s, further preferably 0.5 to 30 mPa·s, and most preferably 1.0 to 20 mPa·s in view of sufficient fluidity. The pigment concentration is preferably in the range of 1 to 30 mass %, more preferably 1 to 25 mass %, further preferably 3 to 20 mass %, and most preferably 5 to 20 mass %.

Ultrasonic is radiated at any condition; an output ranging from 100 to 3000 W and a frequency ranging from 15 to 40 kHz are preferred, and an output ranging from 150 to 2000 W and frequency ranging from 15 to 30 kHz are more preferred.

The output and frequency adjusted to be within such ranges enable a dispersion step by cavitation to be effectively performed, reduce the number of coarse particles in the aqueous pigment dispersion, and give improved chroma (texture) to a colored coating film formed of the aqueous pigment dispersion itself. In ink jet printing with an aqueous ink using the aqueous pigment dispersion, smooth ejection (good ejection stability) is given, a reduction in the quality of a product due to, for example, precipitation of the pigment particles is eliminated, and the erosion (corrosion) of an oscillation rod becomes significantly small with the result that the maintenance cost of the equipment is reduced. Thus, those output and frequency are highly favorable.

Ultrasonic may be radiated for the period of time that is necessary and sufficient to substantially evenly disperse the pigment particles in the aqueous pigment dispersion. In general, an electric energy from 5 to 100 W/g relative to the mass of the pigment contained in a dispersion liquid is applied. It is obvious that the ultrasonic treatment can be performed either for a longer period of time or for a shorter period of time. It is preferred that the period of time for the ultrasonic treatment be determined on the basis of the type of pigment so as not to cause an adverse effect on the size of dispersed particles, viscosity, and performance such as definition of images and so as to avoid a temporal reduction in productivity.

After the ultrasonic radiation to the aqueous pigment dispersion, additional dispersion is optionally carried out. Dispersion and the ultrasonic radiation can be alternately performed.

In this dispersion process, any of different types of known dispersers can be used. Example of the disperser include dispersers involving use of media, such as a sand mill, a beads mill, a pebble mill, a ball mill, a pearl mill, a basket mill, an attritor, a Dyno mill, a bore mill, a Viscomill, a motor mill, an SC mill, a Drais mill, and a paint conditioner, and medium-less dispersers such as a high-speed disk impeller, a colloid mill, a high-pressure homogenizer, a nanomizer, and an ultimazer. It should be noted that the surface of the pigment suffers from unnecessary physical damages in some cases as described above.

The temperature of the aqueous pigment dispersion that is subjected to the ultrasonic radiation is not particularly limited; however, it is preferred that the temperature of the aqueous pigment dispersion be adjusted to be from the freezing point to 70° C. during the ultrasonic radiation. At a temperature lower than the freezing point, the ultrasonic radiation is impossible; at a temperature of not less than 70° C., the moisture is evaporated, and an uncertain condition such as an increase in the pigment concentration occurs.

Any of known techniques can be generally used for cooling the aqueous pigment dispersion during the ultrasonic radiation, such as ice cooling, air cooling, and water cooling. Specific examples of such techniques include a technique in which a cooling medium is allowed to flow inside the jacket of a container holding the aqueous pigment dispersion, a technique in which a container holding the aqueous pigment dispersion is immersed into a cooling medium, a technique in which blows of gas are used, and a technique in which a cooling medium, such as water, and air are used for cooling with evaporation heat.

A technique, for instance, in which cooling water preliminarily cooled to greater than 0° C. but not more than 20° C., preferably greater than 0° C. but not more than 10° C., is used as a cooling medium is one of desirable techniques because it is relatively economical and has a good cooling efficiency. In such a case, the cooling water is circulated with a circulator, and the cooling can be simultaneously performed with a cooling apparatus as well. In this case, it is highly desirable that a material that decreases the freezing temperature, such as ethylene glycol or diethylene glycol, be added to cooling water or that sodium chloride or another material be added thereto to cause depression of freezing point. Accordingly, even in the case where cooling water at greater than 0° C. cannot produce a sufficient cooling effect, such addition of materials makes the temperature of the cooling water further decreased, so that the aqueous pigment dispersion can be maintained at a lower temperature within the above-mentioned temperature range during the ultrasonic radiation. Also in the case of air cooling, use of preliminarily cooled air is preferred rather than merely blowing of air at ambient temperature.

It is desirable that ultrasonic is radiated from a fewer number of apparatuses as much as possible in terms of production costs; however, the minimal number of apparatuses may be connected to each other in series or in parallel for the ultrasonic radiation, if necessary.

The end point of the ultrasonic radiation may be determined by measurement of the sizes of the pigment particles and composite particles with a grind gauge or a commercially available particle size analyzer or by measurement of physical properties such as viscosity, a contact angle, the intensity of reflected light from a coating liquid formed by a variety of techniques, and chroma. Alternatively, it may be determined by direct observation with, for example, a microscope.

(2) Process Using High-concentration Aqueous Pigment Dispersion Liquid (Pigment Paste)

A pigment paste can be preliminarily prepared by any of known dispersion techniques.

Examples of such a technique for preparing a pigment paste include the following techniques (i) to (iii).

(i) A pigment is added to an aqueous medium containing a pigment dispersant and water, and then the pigment is dispersed in the aqueous medium with a stirrer and a disperser, thereby producing the pigment paste.

(ii) A pigment and a pigment dispersant are kneaded with a kneader such as a twin roll or a mixer, the kneaded product is added to an aqueous medium containing water, and a stirrer and a disperser are used to produce the pigment paste.

(iii) A pigment dispersant is dissolved in an organic solvent having a compatibility with water, such as methyl ethyl ketone or tetrahydrofuran, a pigment is added to this solution, the pigment is dispersed in the organic solution with a stirrer and a disperser, the resulting solution is subjected to phase-transfer emulsification with an aqueous medium, and the organic solvent is distilled off, thereby producing the pigment paste.

Any kneader can be used; examples of the kneader include a Henschel mixer, a pressure kneader, a Banbury mixer, and a planetary mixer.

Any stirrer and disperser can be used; examples thereof include an ultrasonic homogenizer, a high-pressure homogenizer, a paint shaker, a ball mill, a roll mill, a sand mill, a sand grinder, a Dyno-mill, a Dispermat, an SC mill, and a Nanomizer. These can be used alone or in combination.

The pigment content in the pigment paste is preferably in the range of 5 to 60 mass %, and more preferably from 10 to 50 mass %. At a pigment content of less than 5 mass %, an aqueous pigment dispersion and aqueous ink prepared using such a pigment paste are likely to give insufficient coloration and therefore fail to produce sufficient image density. At a pigment content of greater than 60 mass %, the dispersion stability of the pigment in the pigment paste is likely to decrease.

Since the presence of coarse particles causes image properties to be impaired, the coarse particles are preferably appropriately removed by, for instance, centrifugal separation or filtration before or after preparation of the ink.

Impurities are removed by an ion exchange treatment and ultrafiltration after the dispersion step, and then the resulting product may be subjected to an after-treatment. The ion exchange treatment enables removal of ionic substances such as cations and anions (for example, divalent metal ion), and the ultrafiltration enables removal of dissolved impurities (for instance, residual substances from synthesis of the pigment, a component in excess in the composition of the dispersion liquid, a resin not adsorbed to the organic pigment, and foreign substances). In the ion exchange treatment, any of known ion exchange resins are used. In the ultrafiltration, any of known ultrafiltration membranes is used, and either of a normal type and a type with a performance enhanced double may be used. In the case where the pigment paste has a high viscosity, it may be properly diluted with water.

The fumed silica can be added in any manner, and it may be added to the aqueous pigment dispersion produced as described above in an appropriate amount and then stirred.

In the case of, for example, fumed silica that has been already dispersed in water, it may be added to the aqueous pigment dispersion produced as described above in an appropriate amount and then stirred. In the case of powder fumed silica, it is preliminarily mixed with water and alkali (above-mentioned inorganic basic compounds including hydroxides of alkali metals such as potassium and sodium, carbonates of alkali metals such as potassium and sodium, carbonates of alkali earth metals such as calcium and barium, and ammonium hydroxide and organic basic compounds including amino-alcohols such as triethanolamine, N,N-dimethanolamine, N-aminoethylethanolamine, dimethylethanolamine, and N—N-butyldiethanolamine, morpholines such as morpholine, N-methylmorpholine, and N-ethylmorpholine, and piperazines such as N-(2-hydroxyethyl)piperazine and piperazine hexahydrate) and dispersed to prepare a fumed silica dispersion liquid, and an appropriate amount of the fumed silica dispersion liquid may be added to the aqueous pigment dispersion produced as described above and then stirred. A disperser used to prepare the fumed silica dispersion liquid is not particularly limited; in terms of avoiding impairment of the surface quality and shape of the fumed silica, examples of the disperser include non-contact dispersers such as an ultrasonic disperser, a high-speed disk impeller, a colloid mill, a roll mill, a high-pressure homogenizer, a nanomizer, and an ultimazer. In particular, a process involving use of an ultrasonic disperser is preferred in view of productivity and contamination brought about by abrasion of media (presence of foreign substances and pollution).

The pigment concentration in the aqueous pigment dispersion of the present invention is not particularly limited. The pigment concentration is normally in the range of 1 to 60 mass % in many case, preferably 5 to 40 mass %, and most preferably 10 to 20 mass % relative to the amount of the whole aqueous pigment dispersion.

(Aqueous Ink Jet Recording Ink)

The aqueous pigment dispersion is diluted to adjust the concentration to a predetermined level and can be used in a variety of applications, for example, coating of automobiles and building materials; printing inks such as offset inks, gravure inks, flexographic inks, and silk screen inks; and aqueous ink jet recording inks.

In the case where the aqueous pigment dispersion of the present invention is applied to an ink jet recording ink, it is prepared by adding a water-soluble solvent and/or water, a high-molecular organic compound containing an anionic group as a binder, or another material thereto and optionally adding a humectant (drying inhibitor), a penetrant, or another additive to obtain the intended physical properties.

After the preparation of the ink, centrifugal separation or filtration may be optionally performed.

The physical properties of the ink are not particularly limited; however, in view of the ejection stability of an ink jet ink, the viscosity is preferably from 1 to 10 (mPa·s), the surface tension is preferably from 20 to 50 (mN/m), and the pigment concentration is preferably from 1 to 10 mass %.

(Humectant)

The humectant is added to prevent the ink from being dried. The amount of the humectant used in the ink for preventing drying is preferably in the range of 3 to 50 mass %.

The humectant used in the present invention is not particularly limited, but a humectant that is miscible with water and that serves to prevent the head of an ink jet printer from being clogged is preferred. Examples of such a humectant include glycerin, ethylene glycol, diethylene glycol, triethylene glycol, polyethylene glycol having a molecular weight of 2000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, meso-erythritol, and pentaerythritol. In particular, use of propylene glycol or 1,3-butyl glycol is safe and highly effective in ink drying properties and ejection of the ink.

(Penetrant)

The penetrant is added to improve penetration of the ink to a medium subjected to recording or to adjust the diameter of a dot on the recording medium.

Examples of the penetrant include lower alcohols such as ethanol and isopropyl alcohol; ethylene oxide additives of alkyl alcohols, such as ethylene glycol hexyl ether and diethylene glycol butyl ether; and propylene oxide additives of alkyl alcohols, such as propylene glycol propyl ether.

(Surfactant)

A surfactant is added to adjust the properties of the ink, such as surface tension. The surfactant that can be used for this purpose is not particularly limited, and examples thereof include a variety of anionic surfactants, nonionic surfactants, cationic surfactants, and amphoteric surfactants. Of these, anionic surfactants and nonionic surfactants are preferred.

Examples of the anionic surfactants include alkylbenzenesulfonates, alkylphenylsulfonates, alkylnaphthalenesulfonates, salts of higher fatty acids, sulfates of higher fatty acid esters, sulfonates of higher fatty acid esters, sulfates and sulfonates of higher alcohol ethers, higher alkylsulfosuccinates, polyoxyethylene alkyl ether carboxylates, polyoxyethylene alkyl ether sulfates, alkyl phosphates, and polyoxyethylene alkyl ether phosphates. Specific examples of such anionic surfactants include dodecylbenzene sulfonates, isopropylnaphthalene sulfonates, monobutylphenylphenol monosulfonates, monobutylbiphenyl sulfonates, and dibutylphenylphenol disulfonates.

Examples of the nonionic surfactants include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglyceryl fatty acid esters, sucrose fatty acid esters, polyoxyethylene alkylamines, polyoxyethylene fatty acid amides, fatty acid alkylolamides, alkyl alkanolamides, acetylene glycol, oxyethylene adducts of acetylene glycol, and polyethylene glycol polypropylene glycol block copolymers. Of these, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, and polyethylene glycol polypropylene glycol block copolymers are preferred.

Examples of other surfactants that may be used include silicone-based surfactants such as polysiloxane oxyethylene adducts; fluorine-based surfactants such as perfluoroalkyl carboxylates, perfluoroalkyl sulfonates, and oxyethylene perfluoroalkyl ethers; and biosurfactants such as spicrispolic acid, rhamnolipid, and lysolecithin.

These surfactants may be used alone or in combination. In the case where a surfactant is added, the amount thereof is preferably in the range of 0.001 to 2 mass %, more preferably 0.001 to 1.5 mass %, and further preferably 0.01 to 1 mass % relative to the mass of the whole ink. At an amount of the surfactant of less than 0.001 mass %, use of the surfactant tends to give no effect; at an amount of the surfactant of greater than 2 mass %, problems such as ink bleeding are likely to be caused.

Moreover, preservatives, viscosity modifiers, pH controlling agents, chelating agents, plasticizers, antioxidants, ultraviolet absorbers, and other materials may be optionally added.

(Recording Medium)

An aqueous ink formed of the aqueous pigment dispersion of the present invention, particularly an ink jet recording ink, can produce high optical density particularly on plain paper and is therefore suitable for printing particularly on plain paper; however, it can be obviously used in recording on other absorbent recording Media.

Examples of the absorbent recording medium include plain paper, (fine) coating paper, fabric, ink jet paper, ink jet glossy paper, card boards, and wood.

EXAMPLES

Examples of the present invention will now be described in detail.

The terms "g" and "%" refer to "mass g" and "mass %", respectively, unless otherwise specified.

In Examples, a resin A as an acrylic resin having an anionic group or a resin solution A in which the resin A had been dissolved in methyl ethyl ketone was used as a pigment dispersant, and aqueous pigment dispersions were produced by any of two production processes of (1) ultrasonic dispersion and (2) kneading.

Produced aqueous pigment dispersions were evaluated on the basis of the degree of an enhancement in optical density and chroma.

(Pigment Dispersant: Resin A)

The resin A in which the composition ratio of monomers of styrene/methacrylic acid/acrylic acid was 77/13/10 (on a mass basis) and which had the following properties was used: a mass average molecular weight of 8800, an acid value of 150 mgKOH/g, and a glass transition temperature of 107° C.

(Pigment Dispersant: Resin Solution A)

To 50 g of the resin A in which the composition ratio of monomers of styrene/methacrylic acid/acrylic acid was 77/13/10 (on a mass basis) and which had a mass average molecular weight of 8800, an acid value of 150 mgKOH/g, and a glass transition temperature of 107° C., 50 g of methyl ethyl ketone (hereinafter referred to as MEK), 87.4 g of ion exchanged water, and 22 g of a 34 mass % aqueous potassium hydroxide (KOH) solution were added. The solution was well stirred to produce a resin solution. The MEK was removed from this resin solution at a water bath temperature of 45° C. and a reduced pressure of 40 hPa to a resin solid content of 20 mass %, thereby obtaining the resin solution A.

(Process for Producing Aqueous Black Pigment Dispersion: (Process 1) Ultrasonic Dispersion)

A pigment, the resin solution A, and ion exchanged water were put into a metal beaker in the amounts shown in the below recipe, and the content was manually well stirred to produce a mixture. Then, the mixture was subjected to ultrasonic dispersion for 10 minutes with an ultrasonic disperser (UP200St manufactured by Hielscher Ultrasonics GmbH, maximum output: 200 W, frequency: 26 KHz). The energy applied in the ultrasonic dispersion was 2.2 W/g per unit carbon black.

Then, the produced pigment composition was mixed with any of the silica liquids shown in Table 1 as shown in the recipe, and the mixture was stirred with a stirrer for 5 minutes to yield an aqueous pigment dispersion of the present invention. The pigment content and silica content of the produced aqueous pigment dispersion are shown in the recipe.

Each of the silica liquids B to E was adjusted to have a concentration of 15 mass % by preliminarily subjecting a mixture liquid of 15 g of silica powder, 84.7 g of ion exchanged water, and 0.3 g of a basic compound (34 mass % aqueous potassium hydroxide solution) to ultrasonic dispersion for 3 minutes with the above-mentioned ultrasonic disperser (UP200St manufactured by Hielscher Ultrasonics GmbH, maximum output: 200 W, frequency: 26 KHz).

Each of the silica liquid A and the silica liquids F to I is originally a dispersion liquid and was therefore adjusted to have a concentration of 15 mass % by appropriately adding ion exchanged water thereto.

The average particle size of dispersed particles and the standard deviation of particle size distribution in each of the silica liquids were measured at a silica concentration of 1.5% (solvent: water, temperature: 25° C.) with a dynamic light scattering Nanotrac particle size analyzer UPA-150EX (manufactured by NIKKISO CO., LTD.).

(Process for Producing Aqueous Black Pigment Dispersion: (Process 2) Kneading)

A pigment, the resin A, a basic compound (34 mass % aqueous potassium hydroxide solution), and triethylene glycol as an aqueous medium were put into a planetary mixer (ACMO4LVTJ-B manufactured by Aicohsha Manufacturing Co., Ltd.) in amounts shown in the recipe and kneaded for 60 minutes at a jacket temperature of 60° C. and an impeller-rotating speed of 25 rpm (number of revolution: 80 rpm). All of the kneaded product was put into a home-use mixer (Healthy Mix manufactured by ZOJIRUSHI CORPORATION), ion exchanged water was added thereto to a pigment concentration of 15 mass %, and then the content was dissolved by stirring for 20 minutes in a state in which the mixer was tightly confined, thereby obtaining a pigment composition having a pigment concentration of 15 mass %.

Then, the produced pigment composition, any of the fumed silica liquids shown in Table 1 (each liquid had a silica concentration of 15 mass %), and ion exchanged water were mixed with each other as shown in the recipe and stirred for 5 minutes with a stirrer to produce an aqueous pigment dispersion of the present invention. The pigment content and fumed silica content of the produced aqueous pigment dispersion are shown in the recipe.

TABLE 1

| Silica Liquid | Type of Silica | Primary particle size (nm) | Average dispersed particle size (nm) | Standard deviation of particle size distribution (nm) | Remarks |
|---|---|---|---|---|---|
| A | W7520 | 12 | 120 | 68 | Fumed silica |
| B | 130 | 16 | 180 | 82 | (manufactured by NIPPON |
| C | 200 | 12 | 160 | 69 | AEROSIL CO., LTD.) |
| D | 50 | 30 | 230 | 90 | |
| E | R816 | 12 | 170 | 73 | |
| F | MP1040 | 100 | 110 | 30 | Colloidal silica |
| G | ST-ZL | 85 | 130 | 33 | (manufactured by Nissan Chemical Industries, Ltd.) |
| H | PL-3L | 36 | 60 | 23 | Colloidal silica |
| I | PL-10H | 89 | 230 | 79 | (manufactured by FUSO CHEMICAL CO., LTD.) |

(Evaluation: Measurement of Optical Density (OD) Value)

The produced aqueous pigment dispersions were individually applied to plain paper (PPC paper High-White) and ColorLok paper (HPMP manufactured by HP Inc.) with a #3 wire bar. The coatings were air-dried over 24 hours, and the OD thereof was measured. The results of the measurement are shown in the below recipes.

In the measurement, "Gretag Macbeth Spectro Scan Transmission" (manufactured by X-Rite Inc.) was used, the OD of the coatings was measured at three points multiplied by three points both in longitudinal and transverse directions, namely nine points in total, and the average of the measurement results was employed.

The degree of an enhancement in OD was calculated from the following equation; an enhancement of 3% or more in optical density was defined as G, and an enhancement of less than 3% in optical density was defined as N.

(aqueous pigment dispersions in which fumed silica was not used are Comparative Examples, and thus each of the recipes has the description of Comparative Example used therein)

((OD of aqueous pigment dispersion of Example or Comparative Example)−(OD of aqueous pigment dispersion free from fumed silica))/(OD of aqueous pigment dispersion free from fumed silica)×100(%)  [Math. 2]

(Evaluation: Measurement of Chroma)

In order to calculate chroma, the L*, a*, and b* of each coating were measured as in the measurement of an optical density (OD) value, and chroma $c^*$ ($c^* = \sqrt{(a^* \times a^* + b^* \times b^*)}$) was determined.

The degree of an enhancement in chroma was calculated from the following equation; an enhancement of 3% or more in chroma was defined as G, and an enhancement of less than 3% in chroma was defined as N.

((Chroma c* of aqueous pigment dispersion of Example or Comparative Example)−(Chroma c* of aqueous pigment dispersion free from fumed silica))/(Chroma c* of aqueous pigment dispersion free from fumed silica)×100(%)  [Math. 3]

The recipes (Tables 2 to 7) are as follows.

TABLE 2

| | Black aqueous pigment dispersion | | | | |
|---|---|---|---|---|---|
| | Example 1 | Example 2 | Example 3 | Example 4 | Example 5 |
| Production process | Process (1) | Process (1) | Process (1) | Process (1) | Process (1) |
| Carbon black (#960 manufactured by Mitsubishi Chemical Corporation) (g) | 15 | 15 | 15 | 15 | 15 |
| Resin solution A (g) | 15 | 15 | 15 | 15 | 15 |
| Ion exchanged water (g) | 70 | 70 | 70 | 70 | 70 |
| Pigment composition (g) | 100 | 100 | 100 | 100 | 100 |
| Fumed silica liquid  Type | A | B | C | D | E |
| (g) | 100 | 100 | 100 | 100 | 100 |
| Ion exchanged water (g) | 175 | 175 | 175 | 175 | 175 |
| Pigment content (mass %) | 4 | 4 | 4 | 4 | 4 |
| Fumed silica content (mass %) | 4 | 4 | 4 | 4 | 4 |
| Plain paper: Optical density (OD) | 1.04 | 1.06 | 1.04 | 1.03 | 1.06 |
| Plain paper: Degree of enhancement in optical density (%) | 4.0 | 6.0 | 4.0 | 3.0 | 6.0 |
| | G | G | G | G | G |
| ColorLok paper: Optical density (OD) | 1.66 | 1.68 | 1.67 | 1.64 | 1.69 |
| ColorLok paper: Degree of enhancement in optical density (%) | 7.1 | 8.4 | 7.7 | 5.8 | 9.0 |
| | G | G | G | G | G |

In Table 2, the datum of Comparative Example 5 was used for "OD of aqueous pigment dispersion free from fumed silica" in the equation to calculate the degree of an enhancement in OD.

TABLE 3

| Black aqueous pigment dispersion | Example 6 | Example 7 | Example 8 |
|---|---|---|---|
| Production process | Process (1) | Process (1) | Process (1) |
| Carbon black (#960 manufactured by Mitsubishi Chemical Corporation) (g) | 15 | 15 | 15 |
| Resin solution A (g) | 15 | 15 | 15 |
| Ion exchanged water (g) | 70 | 70 | 70 |
| Pigment composition (g) | 100 | 100 | 100 |
| Fumed silica liquid  Type | B | B | B |
| (g) | 25 | 175 | 275 |
| Ion exchanged water (g) | 250 | 100 | 0 |
| Pigment content (mass %) | 4 | 4 | 4 |
| Fumed silica content (mass %) | 1 | 7 | 11 |

TABLE 3-continued

| Black aqueous pigment dispersion | Example 6 | Example 7 | Example 8 |
|---|---|---|---|
| Plain paper: Optical density (OD) | 1.03 | 1.09 | 1.22 |
| Plain paper: Degree of enhancement in optical density (%) | 3.0 / G | 9.0 / G | 22.0 / G |
| ColorLok paper: Optical density (OD) | 1.60 | 1.73 | 1.90 |
| ColorLok paper: Degree of enhancement in optical density (%) | 3.2 / G | 11.6 / G | 22.6 / G |

In Table 3, the datum of Comparative Example 5 was used for "OD of aqueous pigment dispersion free from fumed silica" in the equation to calculate the degree of an enhancement in OD.

TABLE 4

| Black aqueous pigment dispersion | Example 9 | Example 10 | Example 11 |
|---|---|---|---|
| Production process | Process (2) | Process (2) | Process (2) |
| Carbon black (#960 manufactured by Mitsubishi Chemical Corporation) (g) | 50 | 50 | 50 |
| Resin solution A (g) | 15 | 15 | 15 |
| Basic compound (34 mass % aqueous potassium hydroxide solution) (g) | 6.6 | 6.6 | 6.6 |
| Aqueous medium (triethylene glycol) (g) | 50 | 50 | 50 |
| Ion exchanged water (g) | 212 | 212 | 212 |
| Pigment composition (g) | 333 | 333 | 333 |

TABLE 4-continued

| Black aqueous pigment dispersion | Example 9 | Example 10 | Example 11 |
|---|---|---|---|
| Fumed silica liquid Type | B | B | B |
| (g) | 84 | 583 | 916 |
| Ion exchanged water (g) | 832 | 333 | 0 |
| Pigment content (mass %) | 4 | 4 | 4 |
| Fumed silica content (mass %) | 1 | 7 | 11 |
| Plain paper: Optical density (OD) | 1.04 | 1.10 | 1.21 |
| Plain paper: Degree of enhancement in optical density (%) | 4.0 / G | 10.0 / G | 21.0 / G |
| ColorLok paper: Optical density (OD) | 1.61 | 1.72 | 1.89 |
| ColorLok paper: Degree of enhancement in optical density (%) | 3.9 / G | 11.0 / G | 21.9 / G |

In Table 4, the datum of Comparative Example 5 was used for "OD of aqueous pigment dispersion free from fumed silica" in the equation to calculate the degree of an enhancement in OD.

TABLE 5

| | Black aqueous pigment dispersion | | | | | |
|---|---|---|---|---|---|---|
| | Comparative Example 1 | Comparative Example 2 | Comparative Example 3 | Comparative Example 4 | Comparative Example 5 | Comparative Example 6 |
| Production process | Process (1) | Process (1) | Process (1) | Process (1) | Process (1) | Process (1) |
| Carbon black (#960 manufactured by Mitsubishi Chemical Corporation) (g) | 15 | 15 | 15 | 15 | 15 | 15 |
| Resin solution A (g) | 15 | 15 | 15 | 15 | 15 | 15 |
| Ion exchanged water (g) | 70 | 70 | 70 | 70 | 70 | 70 |
| Pigment composition (g) | 100 | 100 | 100 | 100 | 100 | 100 |
| Colloidal silica liquid Type | F | G | H | I | — | — |
| (g) | 100 | 100 | 100 | 100 | — | — |
| Ion exchanged water (g) | 175 | 175 | 175 | 175 | 275 | 87.5 |
| Pigment content (mass %) | 4 | 4 | 4 | 4 | 4 | 8 |
| Fumed silica content (mass %) | 4 | 4 | 4 | 4 | 0 | 0 |
| Plain paper: Optical density (OD) | 0.98 | 0.98 | 0.99 | 1.00 | 1.00 | 1.02 |
| Plain paper: Degree of enhancement in optical density (%) | -2.0 / N | -2.0 / N | -1.0 / N | 0.0 / N | (Reference) / (Reference) | 2.0 / N |
| ColorLok paper: Optical density (OD) | 1.59 | 1.59 | 1.54 | 1.51 | 1.55 | 1.65 |
| ColorLok paper: Degree of enhancement in optical density (%) | 2.6 / N | 2.6 / N | -0.6 / N | -2.6 / N | (Reference) / (Reference) | 6.5 / G |

In Tables 2 to 4, the datum of Comparative Example 5 was used for "OD of aqueous pigment dispersion free from fumed silica" in the equation to calculate the degree of an enhancement in OD.

(Effect of Black Aqueous Pigment Dispersion)

These results show that the degree of an enhancement in OD was 3% or more in each of the black aqueous pigment dispersions in which 4 mass % of the fumed silica was used (Examples 1 to 5 in Table 1) as compared with that of the black aqueous pigment dispersion which was free from the fumed silica (Comparative Example 5 in Table 4); accordingly, such black aqueous pigment dispersions containing the fumed silica had the effect of an enhancement in OD. In addition, this effect can be produced in recording on both plain paper and ColorLok paper.

Furthermore, the degree of an enhancement in OD was greater in Examples 1 to 5 than in Comparative Example 6 in which the fumed silica was not used but the pigment content was increased to 8 mass % as shown in Table 5. Accordingly, addition of the fumed silica gave a greater effect of an enhancement in OD rather than the increase in the pigment content.

From Table 2, the fumed silica B and E gave particularly greater effect of an enhancement in optical density. This shows that the most preferred standard deviation (SD) of particle size distribution in Table 1 was from 70 to 85 nm.

Each of Comparative Examples 1 to 4 in which 4 mass % of another type of silica, namely colloidal silica, was used as shown in Table 5 had no effect of an enhancement in OD. The standard deviation of the silica F to H used in Comparative Examples 1 to 4 was 20 to 40 nm as shown in Table 1 and was out of the preferred range of standard deviation (SD) from 70 to 85 nm. The standard deviation (SD) of the silica I was 79 and within the preferred range of standard deviation from 70 to 85 nm; however, optical density was not enhanced as shown in Comparative Example 4 in Table 5. This shows that colloidal silica was less likely to produce the effect of an enhancement in optical density.

In Examples 6 to 11 in Tables 3 and 4, the amount of the fumed silica B was changed (ranging from 1 mass % to 11 mass %); the more the amount of the fumed silica B was, the more the degree of an enhancement in OD was. This shows that the amount of silica was not particularly limited. In Examples 8 and 11, 4 mass % of the carbon pigment and 11 mass % of the fumed silica were used, in other words, the fumed silica content was 275 mass % relative to the pigment content, and the effect of an enhancement in OD was produced.

(Process for Producing Cyan Aqueous Pigment Dispersion: (Process 2) Kneading)

Except that the carbon black was changed to a cyan pigment (copper phthalocyanine: Fastogen Blue TGR-SD manufactured by DIC Corporation), an aqueous dispersion having a pigment concentration of 15% was produced as in the above-mentioned (Process 2) Kneading. Then, the produced pigment composition was mixed with a fumed silica liquid B (silica concentration: 15 mass %) shown in Table 6 and ion exchanged water as shown in the recipe, and then the mixture was stirred for 5 minutes with a stirrer, thereby yielding an aqueous pigment dispersion of the present invention.

TABLE 6

| Cyan aqueous pigment dispersion | Example 12 | Comparative Example 7 | Comparative Example 8 |
|---|---|---|---|
| Production process | Process (2) | Process (2) | Process (2) |
| Copper phthalocyanine Fastogen Blue TGR-SD manufactured by DIC Corporation | 50 | 50 | 50 |
| Resin A (g) | 15 | 15 | 15 |
| Basic compound (34 mass % aqueous potassium hydroxide solution) (g) | 6.6 | 6.6 | 6.6 |
| Aqueous medium (triethylene glycol) (g) | 50 | 50 | 50 |
| Ion exchanged water (g) | 212 | 212 | 212 |
| Pigment composition (g) | 333 | 333 | 333 |
| Fumed silica liquid   Type | B | — | — |
|                       (g) | 667 | — | — |
| Ion exchanged water (g) | 250 | 917 | 84 |
| Pigment content (mass %) | 4 | 4 | 12 |

TABLE 6-continued

| Cyan aqueous pigment dispersion | Example 12 | Comparative Example 7 | Comparative Example 8 |
|---|---|---|---|
| Fumed silica content (mass %) | 8 | 0 | 0 |
| Plain paper: Optical density (OD) | 1.27 | 0.97 | 1.07 |
| Plain paper: Degree of enhancement in optical density (%) | 30.9 G | (Reference) (Reference) | 10.3 G |
| ColorLok paper: Optical density (OD) | 1.62 | 1.31 | 1.33 |
| ColorLok paper: Degree of enhancement in optical density (%) | 23.7 G | (Reference) (Reference) | 1.5 N |
| Chroma on plain paper | 53.2 | 43.8 | 39.2 |
| Plain paper: Degree of enhancement in chroma (%) | 21.5 G | (Reference) (Reference) | −10.5 G |
| Chroma on ColorLok paper | 61.1 | 56.5 | 52.9 |
| ColorLok paper: Degree of enhancement in chroma (%) | 8.0 G | (Reference) (Reference) | −6.4 G |

In Table 6, the data of Comparative Example 7 were used for "OD and chroma of aqueous pigment dispersion free from fumed silica" in the equations to calculate the degrees of enhancements in OD and chroma.

(Effect of Cyan Aqueous Pigment Dispersion)

The degrees of enhancements in OD and chroma were greater in the cyan aqueous pigment dispersion in which the silica liquid B containing the fumed silica of "Aerosil 130" was used (Example 12 in Table 6) than in the aqueous pigment dispersion in which fumed silica was not used (Comparative Example 7), which shows that such a cyan aqueous pigment dispersion containing fumed silica gave the effects of enhancements in OD and chroma.

Furthermore, the degrees of enhancements in OD and chroma were much greater in such a cyan aqueous pigment dispersion than in Comparative Example 8 in which the fumed silica was not used but the cyan pigment concentration was increased to 12 mass %. Accordingly, addition of the fumed silica gave greater effects of enhancements in OD and chroma rather than the increase in the cyan pigment content.

Such effects were produced in recording on both plain paper and ColorLok paper as in the black aqueous pigment dispersion.

Consequently, also in the cyan pigment dispersion, use of the fumed silica enabled great effects of enhancements in OD and chroma.

(Process for Producing Yellow Aqueous Pigment Dispersion: (Process 2) Kneading)

Except that the carbon black was changed to a yellow pigment (Pigment Yellow 74: Fast Yellow 7413 (manufactured by SANYO COLOR WORKS, Ltd.)), an aqueous dispersion having a pigment concentration of 15% was produced as in the above-mentioned (Process 2) Kneading. Then, the produced pigment composition was mixed with a fumed silica liquid B (silica concentration: 15 mass %) shown in Table 7 and ion exchanged water as shown in the recipe, and then the mixture was stirred for 5 minutes with a stirrer, thereby yielding an aqueous pigment dispersion of the present invention.

TABLE 7

| Yellow aqueous pigment dispersion | Example 13 | Comparative Example 9 | Comparative Example 10 |
|---|---|---|---|
| Production process | Process (2) | Process (2) | Process (2) |
| Pigment Yellow 74 (Fast Yellow 7413 manufactured by SANYO COLOR WORKS, Ltd.) | 50 | 50 | 50 |
| Resin A (g) | 15 | 15 | 15 |
| Basic compound (34 mass % aqueous potassium hydroxide solution) (g) | 6.6 | 6.6 | 6.6 |
| Aqueous medium (triethylene glycol) (g) | 50 | 50 | 50 |
| Ion exchanged water (g) | 212 | 212 | 212 |
| Pigment composition (g) | 333 | 333 | 333 |
| Fumed silica liquid  Type | B | — | — |
|  (g) | 667 | — | — |
| Ion exchanged water (g) | 250 | 917 | 84 |
| Pigment content (mass %) | 4 | 4 | 12 |
| Fumed silica content (mass %) | 8 | 0 | 0 |
| Plain paper: Optical density (OD) | 1.33 | 0.95 | 1.19 |
| Plain paper: Degree of enhancement in optical density (%) | 40.0 G | (Reference) (Reference) | 25.3 G |
| ColorLok paper: Optical density (OD) | 1.47 | 1.35 | 1.36 |
| ColorLok paper: Degree of enhancement in optical density (%) | 8.9 G | (Reference) (Reference) | 0.7 N |
| Chroma on plain paper | 96.3 | 77.7 | 88.3 |
| Plain paper: Degree of enhancement in chroma (%) | 24.6 G | (Reference) (Reference) | 13.6 G |
| Chroma on ColorLok paper | 103.2 | 99.6 | 99.0 |
| ColorLok paper: Degree of enhancement in chroma (%) | 3.8 G | (Reference) (Reference) | -0.5 N |

In Table 7, the data of Comparative Example 9 were used for "OD and chroma of aqueous pigment dispersion free from fumed silica" in the equations to calculate the degrees of enhancements in OD and chroma.

(Effect of Yellow Aqueous Pigment Dispersion)

The degrees of enhancements in OD and chroma were greater in the yellow aqueous pigment dispersion in which the silica liquid B containing the fumed silica of "Aerosil 130" was used (Example 13 in Table 7) than in the aqueous pigment dispersion in which fumed silica was not used (Comparative Example 9), which shows that such a yellow aqueous pigment dispersion containing fumed silica gave the effects of enhancements in OD and chroma.

Furthermore, the degrees of enhancements in OD and chroma were much greater in such a yellow aqueous pigment dispersion than in Comparative Example 10 in which the fumed silica was not used but the yellow pigment concentration was increased to 12 mass %. Accordingly, addition of the fumed silica gave greater effects of enhancements in OD and chroma rather than the increase in the yellow pigment content.

Such effects were produced in recording on both plain paper and ColorLok paper as in the black aqueous pigment dispersion.

Consequently, also in the yellow pigment dispersion, use of the fumed silica enabled great effects of enhancements in OD and chroma.

The invention claimed is:

1. A method for preparing an aqueous pigment dispersion, the method comprising:
   providing a silica liquid comprising a hydrophilic fumed silica, potassium hydroxide and ion exchanged water;
   providing a styrene-acrylic acid copolymer obtained by copolymerizing monomers comprising a styrene monomer at an amount of 50 to 90 mass %;
   providing an aqueous medium;
   mixing a pigment with the styrene-acrylic acid copolymer and the aqueous medium to prepare a first mixture; and
   subsequently mixing the first mixture with the silica liquid to prepare the aqueous pigment dispersion.

2. The method according to claim 1, wherein an average particle size of dispersed particles of the hydrophilic fumed silica is not more than 250 nm.

3. The method according to claim 1, wherein the amount of the hydrophilic fumed silica is in the range of 20 to 300 mass % relative to the amount of the pigment.

4. The method according to claim 1, wherein the amount of the pigment is in the range of 0.5 to 30 mass % relative to the amount of the whole aqueous pigment dispersion.

5. The method according to claim 1, wherein the amount of styrene monomers used as a raw material of the styrene-acrylic acid copolymer is in the range of 50 to 90 mass % with respect to the raw material of the styrene-acrylic acid copolymer.

6. The method according to claim 2, wherein the average particle size of the dispersed particles of the hydrophilic fumed silica is in the range of 50 nm to 250 nm.

7. The method according to claim 1, wherein the first mixture is prepared by a ultrasonic dispersion process or a kneading process.

8. A method for producing an ink jet recording ink, the method comprising:
   providing a silica liquid comprising a hydrophilic fumed silica, potassium hydroxide and ion exchanged water;
   providing a styrene-acrylic acid copolymer obtained by copolymerizing monomers comprising a styrene monomer at an amount of 50 to 90 mass %;
   providing an aqueous medium;
   mixing a pigment with the styrene-acrylic acid copolymer and the aqueous medium to prepare a first mixture;
   subsequently mixing the first mixture with the silica liquid to prepare the aqueous pigment dispersion; and
   diluting the aqueous pigment dispersion with a solvent to obtain the ink jet recording ink.

9. A method for producing a printed article, the method comprising:
   providing a silica liquid comprising a hydrophilic fumed silica, potassium hydroxide and ion exchanged water;
   providing a styrene-acrylic acid copolymer obtained by copolymerizing monomers comprising a styrene monomer at an amount of 50 to 90 mass %;
   providing an aqueous medium;
   mixing a pigment with the styrene-acrylic acid copolymer and the aqueous medium to prepare a first mixture;
   subsequently mixing the first mixture with the silica liquid to prepare the aqueous pigment dispersion; and
   diluting the aqueous pigment dispersion with a solvent to obtain the ink jet recording ink; and
   applying the ink jet recording ink onto a media to obtain the printed article.

* * * * *